(12) United States Patent
Hennemann et al.

(10) Patent No.: US 9,810,358 B2
(45) Date of Patent: Nov. 7, 2017

(54) MALE PUSH LOCK PIPE CONNECTION SYSTEM

(75) Inventors: Thomas L. Hennemann, Cottage Grove, MN (US); Garth H. Saul, Faribault, MN (US)

(73) Assignee: Aqseptence Group, Inc., New Brighton, MN (US)

( * ) Notice: Subject to any disclaimer, the term of this patent is extended or adjusted under 35 U.S.C. 154(b) by 491 days.

(21) Appl. No.: 12/494,073

(22) Filed: Jun. 29, 2009

(65) Prior Publication Data

US 2010/0194104 A1 Aug. 5, 2010

Related U.S. Application Data

(63) Continuation-in-part of application No. 12/365,000, filed on Feb. 3, 2009.

(51) Int. Cl.
*F16L 37/091* (2006.01)
*F16L 37/084* (2006.01)
(Continued)

(52) U.S. Cl.
CPC ............ *F16L 37/091* (2013.01); *F16L 37/088* (2013.01); *F16L 37/0842* (2013.01); *F16L 37/098* (2013.01)

(58) Field of Classification Search
CPC ....... F16L 21/08; F16L 21/007; F16L 21/035; F16L 37/0842; F16L 37/088; F16L 37/091; F16L 37/0925; F16L 37/098

(Continued)

(56) References Cited

U.S. PATENT DOCUMENTS

| 1,587,079 A | 6/1926 | Machino |
| 2,111,956 A | 3/1938 | Baldwin |

(Continued)

FOREIGN PATENT DOCUMENTS

| CH | 688 659 A5 | 12/1997 |
| DE | 24 40 886 A1 | 3/1976 |

(Continued)

OTHER PUBLICATIONS

Transcript of May 12, 2004 deposition of Certainteed Corporation witness John Stott, pp. 120 and 209-214, Civil No. 03-CV-2131 in the United States District Court, Eastern District of Pennsylvania Action.

(Continued)

*Primary Examiner* — Gregory Binda
*Assistant Examiner* — Zachary Dragicevich
(74) *Attorney, Agent, or Firm* — Patterson Thuente Pedersen, P.A.

(57) ABSTRACT

A pipe for connecting to a similar adjacent pipe. The pipe has a male end with a plurality of rigid fingers extending from within and out of at least one exterior circumferential groove disposed on its exterior surface. On the female end is at least one interior circumferential groove sized and positioned to receive the plurality of rigid fingers from a corresponding exterior circumferential groove on the male end of an adjacent pipe. The number of exterior circumferential grooves on the male end typically corresponds to the number of interior circumferential grooves on the female end. When the male end of the pipe inserts into the female end of a similar adjacent pipe, the plurality of rigid fingers is received within a corresponding interior circumferential groove on the female end, thereby preventing the male end of the pipe from being withdrawn from the female end of the similar adjacent pipe.

27 Claims, 9 Drawing Sheets

(51) Int. Cl.
  *F16L 37/088* (2006.01)
  *F16L 37/098* (2006.01)

(58) Field of Classification Search
  USPC .................. 285/319, 321, 340, 400, 307
  See application file for complete search history.

(56) References Cited

U.S. PATENT DOCUMENTS

| | | | |
|---|---|---|---|
| 2,785,910 A | 3/1957 | Munger | |
| 3,272,538 A | 9/1966 | Bergstrom | |
| 3,389,923 A * | 6/1968 | Love, Jr. | F16L 37/088 285/321 |
| 3,413,021 A | 11/1968 | Pott | |
| 3,534,776 A | 10/1970 | Gilreath | |
| 3,744,824 A * | 7/1973 | Roos | 285/317 |
| 3,784,235 A | 1/1974 | Kessler | |
| 3,995,897 A | 12/1976 | Paskert | |
| 4,030,850 A | 6/1977 | Hyde | |
| 4,072,328 A | 2/1978 | Elliott | |
| 4,105,226 A | 8/1978 | Frey | |
| 4,128,264 A | 12/1978 | Oldford | |
| 4,191,384 A | 3/1980 | Svedberg | |
| 4,276,010 A | 6/1981 | Shartzer | |
| 4,471,978 A | 9/1984 | Kramer | |
| 4,490,576 A | 12/1984 | Bolante | |
| 4,508,369 A | 4/1985 | Mode | |
| 4,600,223 A | 7/1986 | de Vries | |
| 4,749,214 A | 6/1988 | Hoskins | |
| 4,779,902 A | 10/1988 | Lee | |
| 4,781,400 A | 11/1988 | Cunningham | |
| 4,854,397 A | 8/1989 | Warren | |
| 4,875,713 A | 10/1989 | Carstensen | |
| 4,875,714 A | 10/1989 | Lee | |
| 4,927,185 A | 5/1990 | McNaughton | |
| 4,962,579 A | 10/1990 | Moyer et al. | |
| 4,979,765 A | 12/1990 | Bartholomew | |
| 5,005,877 A | 4/1991 | Hayman | |
| 5,015,014 A | 5/1991 | Sweeney | |
| 5,119,892 A | 6/1992 | Clegg | |
| 5,219,188 A | 6/1993 | Abe | |
| 5,251,942 A | 10/1993 | Whaley | |
| 5,378,024 A | 1/1995 | Kumagai | |
| 5,533,761 A | 7/1996 | Ostrander | |
| 5,542,717 A | 8/1996 | Rea | |
| 5,580,100 A | 12/1996 | Umezawa | |
| 5,584,512 A * | 12/1996 | Carstensen | 285/55 |
| 5,662,360 A | 9/1997 | Guzowski | |
| 5,685,575 A | 11/1997 | Allread | |
| 5,716,081 A | 2/1998 | Leigh-Monstevens et al. | |
| 5,738,388 A | 4/1998 | Sundelin | |
| 5,826,921 A | 10/1998 | Woolley | |
| 5,845,945 A * | 12/1998 | Carstensen | 285/321 |
| 5,918,914 A | 7/1999 | Morris | |
| 5,934,709 A | 8/1999 | Morrison | |
| 5,971,445 A | 10/1999 | Norkey | |
| 5,975,591 A | 11/1999 | Guest | |
| 5,988,704 A | 11/1999 | Ryhman | |
| 5,988,705 A | 11/1999 | Norkey | |
| 6,062,326 A | 5/2000 | Strong | |
| 6,152,496 A | 11/2000 | Kouda | |
| 6,176,523 B1 | 1/2001 | Winslett | |
| 6,325,424 B1 * | 12/2001 | Metcalfe et al. | 285/305 |
| 6,343,814 B1 | 2/2002 | Bucher | |
| 6,401,820 B1 | 6/2002 | Kirk | |
| 6,464,024 B2 | 10/2002 | Beaton | |
| 6,499,771 B1 | 12/2002 | Snyder, Sr. et al. | |
| 6,568,658 B2 | 5/2003 | Strome | |
| 6,666,480 B2 | 12/2003 | Haney | |
| 6,688,655 B1 | 2/2004 | Watanabe | |
| 6,964,435 B2 | 11/2005 | Wolf | |
| 6,988,747 B2 | 1/2006 | Allen | |
| 7,029,035 B2 | 4/2006 | Seymour | |
| 7,097,211 B2 | 8/2006 | Adams | |
| 7,261,326 B2 | 8/2007 | Haney | |
| 7,264,281 B2 | 9/2007 | Le Quere | |
| 7,425,024 B2 | 9/2008 | Haney | |
| 7,445,247 B2 | 11/2008 | Erickson | |
| 7,445,250 B2 | 11/2008 | Swift | |
| 7,455,328 B2 | 11/2008 | Chelchowski | |
| 7,469,933 B2 | 12/2008 | Swift | |
| 7,470,383 B2 | 12/2008 | Haney | |
| 7,523,966 B2 | 4/2009 | O'Neill | |
| 7,810,850 B2 | 10/2010 | O'Neill | |
| 7,832,774 B2 | 11/2010 | Densel | |
| 7,841,630 B1 | 11/2010 | Auray | |
| 7,963,570 B2 | 6/2011 | Swift | |
| 2002/0017787 A1 * | 2/2002 | Sakazaki | F16L 11/04 285/226 |
| 2003/0094813 A1 | 5/2003 | Bucher | |
| 2003/0116960 A1 | 6/2003 | Yates | |
| 2003/0122372 A1 | 7/2003 | Muto | |
| 2003/0155763 A1 | 8/2003 | Wolf et al. | |
| 2004/0070198 A1 | 4/2004 | Rohrig | |
| 2004/0245766 A1 | 12/2004 | Vallee | |
| 2006/0214422 A1 | 9/2006 | Cuvo | |
| 2007/0001450 A1 | 1/2007 | Swift | |
| 2008/0303274 A1 | 12/2008 | Mazzaferro et al. | |
| 2010/0078934 A1 | 4/2010 | Matsunaga | |
| 2010/0194098 A1 | 8/2010 | Hennemann et al. | |
| 2010/0295299 A1 | 11/2010 | Ziu | |

FOREIGN PATENT DOCUMENTS

| | | |
|---|---|---|
| EP | 0 664 405 1 | 7/1995 |
| EP | 1 669 655 A1 | 6/2006 |
| EP | 1 703 191 A2 | 9/2006 |
| EP | 1 933 074 A2 | 6/2008 |
| FR | 2 810 087 A1 | 12/2001 |
| GB | 1 584 085 | 2/1981 |
| WO | 00/57096 | 9/2000 |
| WO | 2004/104365 | 12/2004 |

OTHER PUBLICATIONS http://www.seatechinc.com/Technical/Product_Features, webpage printed Jan. 22, 2009.
Brochure of Sea Tech, Inc. For "10 Series Quick-Connect fittings and values" dated 2008.
Mid-Continent, "PVC Water Well Casings and Screens" brochure, pp. MP00014-MP00017, published Apr. 1975, place of publication—unknown.
VMT Fibreglass Industries, "Glasspoll Fibreglass Reinforced Plastic Pipes and Screens" brochure, pp. 1-4, Jan. 1998, place of publication—unknown.
Eastern District of Pennsylvania, Order construing term "predetermined interior diameter" of U.S. Patent. No. 6,666,480, (Doc. No. 116), p. 1, Oct. 24, 2005, Civil Action No. 03-CV-2131, published on PACER (www.pacer.gov).
Eastern District of Pennsylvania, "Memorandum of Plaintiff Certainteed Corporation in Support of Motion for Summary Judgment of Invalidity of the Patent in Suit," (Doc. No. 92), pp. 4-7, 9-12, Sep. 19, 2005, Civil Action No. 03-CV-2131, published on PACER (www.pacer.gov).
Marcel Decker, Inc., Thomas Sixsmith, "Handbook of Thermoplastic Piping System Design," pp. 137-141, 1997, No. ISBN 0-8247-9846-5
CertainTeed Corporation, "Kwik-Set® Threaded Drop Pipe" brochure, p. 1, 2004, place of publication—unknown.
Eastern District of Pennsylvania, "Memorandum and Order" construing certain claim terms of U.S. Patent. No. 6,666,480, (Doc. No. 75), pp. 1-19, May 2, 2005, Civil Action No. 03-CV-2131, published on PACER (www.pacer.gov).
Transcript of Nov. 18, 2004 deposition of Northern Products witness Victor Weigel, pp. 40-41, 85-91, Civil No. A3-04-18 in the North Dakota District Court, Southeastern Division Action.
European Patent Office, European Application No. 10006705.7 Office Action dated Jun. 28, 2013. pp. 1-6.
European Patent Office; First Examination Report; dated Jan. 2, 2013; issued in European Patent Application No. 10 006 7051.

(56) References Cited

OTHER PUBLICATIONS

Canadian Intellectual Property Office; Second Office Action; dated Jan. 15, 2013; issued in Canadian Patent Application No. 2,708,488.
European Patent Office, European Application No. 10006705.7 Office Action dated Jul. 9, 2014, 5 pages.
European Patent Office, European Application No. 10250178.0 Office Action dated Jul. 30, 2013, pp. 1-4.
European Patent Office, European Application No. 10250178.0, Office Action dated Oct. 27, 2014, 6 pages.
International Bureau; Notification Concerning Transmittal of International Preliminary Report on Patentability and International Preliminary Report on Patentability; dated Sep. 15, 2015; for Application No. PCT/US2014/028259, 10 pages.
PCT; Notification of Transmittal of the International Search Report and the Written Opinion of the International Searching Authority, or the Declaration, for PCT/US14/28259, dated Mar. 27, 2015; 16 pages.

* cited by examiner

MALE PUSH LOCK PIPE CONNECTION SYSTEM

This application is a continuation-in-part of prior U.S. patent application Ser. No. 12/365,000, filed Feb. 3, 2009.

BACKGROUND OF THE INVENTION

1. Field of the Invention

The present invention relates generally to pipe connections and methods of securely connecting pipes, regardless of the material from which the connecting pipes are manufactured. More specifically, the preferred embodiment of the present invention relates to connection system that uses a plurality of rigid locking fingers extending from the exterior surface of a male end of the pipe and corresponding locking grooves on the interior surface of a female end of the pipe for receiving rigid locking fingers from a connecting length of pipe. The present invention offers a quick connection of two lengths of pipe without gluing, threading, or welding, as well as other advantages described herein. The connection system can be implemented into lengths of pipe through a manufacturing process so that the end product is an entire product line of pipe that employs the present connection system.

2. Description of the Related Art

In piping systems, there is a variety of ways to connect or join two separate lengths of pipe. In general, connections between two lengths of pipe traditionally have been achieved through one of four ways: (1) gluing or cementing; (2) welding; (3) threading; or (4) external connections such as collars and flanges. In gluing or cementing, an adhesive is applied to the male end, to the female end, or to both ends of the pipes being joined. The male end of one pipe is inserted into the female end of the adjacent pipe being joined and the adhesive cures, permanently joining the pipes. With welding, two metal pipes are joined using molten metal. In threading, the male end of a pipe has external threads and the female end of the adjacent pipe has internal threads. The male end is inserted into the female end of the adjacent pipe, the pipes are rotated, and the threads engage each other. External connections such as collars and flanges can be connected with adhesive, welds, or with threaded fasteners.

Each of the aforementioned connection types has certain disadvantages. For example, a glued or cemented connection can be cumbersome and time consuming. The pipe surfaces must be cleaned and the adhesive applied and allowed to cure before the connection can withstand tensile force. Further, the pipes cannot be disconnected without destruction of at least a portion of the pipe. In threaded connections, the connection can be achieved quicker and the pipes usually can be disconnected and reused, but threaded connections typically cannot withstand high tensile forces. In addition, threaded connections can be cross-threaded relatively easily and require tools to grip, hold, and turn the pipes. Welded connections can withstand significant tensile forces but can only be used on metal pipes. Further, creating the weld is a time-consuming task, and, once the weld is formed it is difficult to remove and may not be possible without pipe destruction. With external connections, the connection often can be removed and can withstand significant tensile forces, but forming the connection is also a time-consuming task.

It is therefore desirable to provide a type of pipe that allows a connection that will withstand large tensile forces and can be quickly formed with similar adjacent pipes without tools. It is also desirable to provide a connection that can be achieved regardless of the material from which the pipe is made.

BRIEF SUMMARY OF THE INVENTION

The pipe of the present invention provides the advantage of a connection that can be quickly formed between pipes of the same or different materials. In addition, the connection formed between two similar, adjacent pipes may have a comparatively high tensile yield strength.

The pipe of the present invention has a female end for receiving a male end of a similar adjacent pipe. The interior surface of the female end has interior circumferential grooves and the exterior surface of the male end has corresponding exterior circumferential grooves. When the male end of the similar adjacent pipe is fully inserted into the female end, rigid fingers extending from the exterior circumferential grooves of the male end are received within the interior circumferential grooves of the female end and prevent the male end from being withdrawn.

The female end of the pipe has a female leading edge and an interior surface, which defines a male end receiving chamber within the female end. The male end receiving chamber will ultimately receive the male end of the similar adjacent pipe. The interior surface of the female end has at least one and preferably a plurality of interior circumferential grooves disposed on it.

The male end of the pipe has a male leading edge, which leads the male end into the male end receiving chamber of the female end of a similar adjacent pipe. The male end has an outer circumference which is slightly smaller in diameter than the diameter of the male end receiving chamber on the female end. Disposed on the exterior surface of the male end are at least one and preferably a plurality of exterior circumferential grooves. The number of exterior circumferential grooves will typically correspond to the number of interior circumferential grooves disposed on the interior surface of the female end of a similar adjacent pipe.

Rigid fingers extend out from the exterior circumferential grooves of the male end, away from the exterior surface of the male end. Preferably, the rigid fingers extending from each exterior circumferential groove extend from an elastic ring, which is seated within each of the exterior circumferential grooves.

The interior circumferential grooves on the female end are configured to receive the rigid fingers extending from within the exterior circumferential grooves on the male end of a similar adjacent pipe. During insertion of the male end into the male end receiving chamber, the rigid fingers on the male end are displaced in a direction toward the exterior surface of the male end so the male end can be fully inserted into the female end. When the male end is fully inserted into the male end receiving chamber the rigid fingers extending from the exterior circumferential grooves on the male end are positioned within corresponding interior circumferential grooves on the female end. The rigid fingers and their positioning within the corresponding interior circumferential grooves prevent the male end from being withdrawn.

DETAILED DESCRIPTION OF THE INVENTION

Referring to FIGS. 1-4, the preferred embodiment of the present invention is shown with a pipe 10 and a similar adjacent pipe 12. In practice, the pipe 10 has the same structure as the similar adjacent pipe 12 and therefore, a description of structure that is present for the similar adjacent pipe 12 in the Figures applies equally to a description of the structure for the pipe 10, and vice versa.

Figure 1:
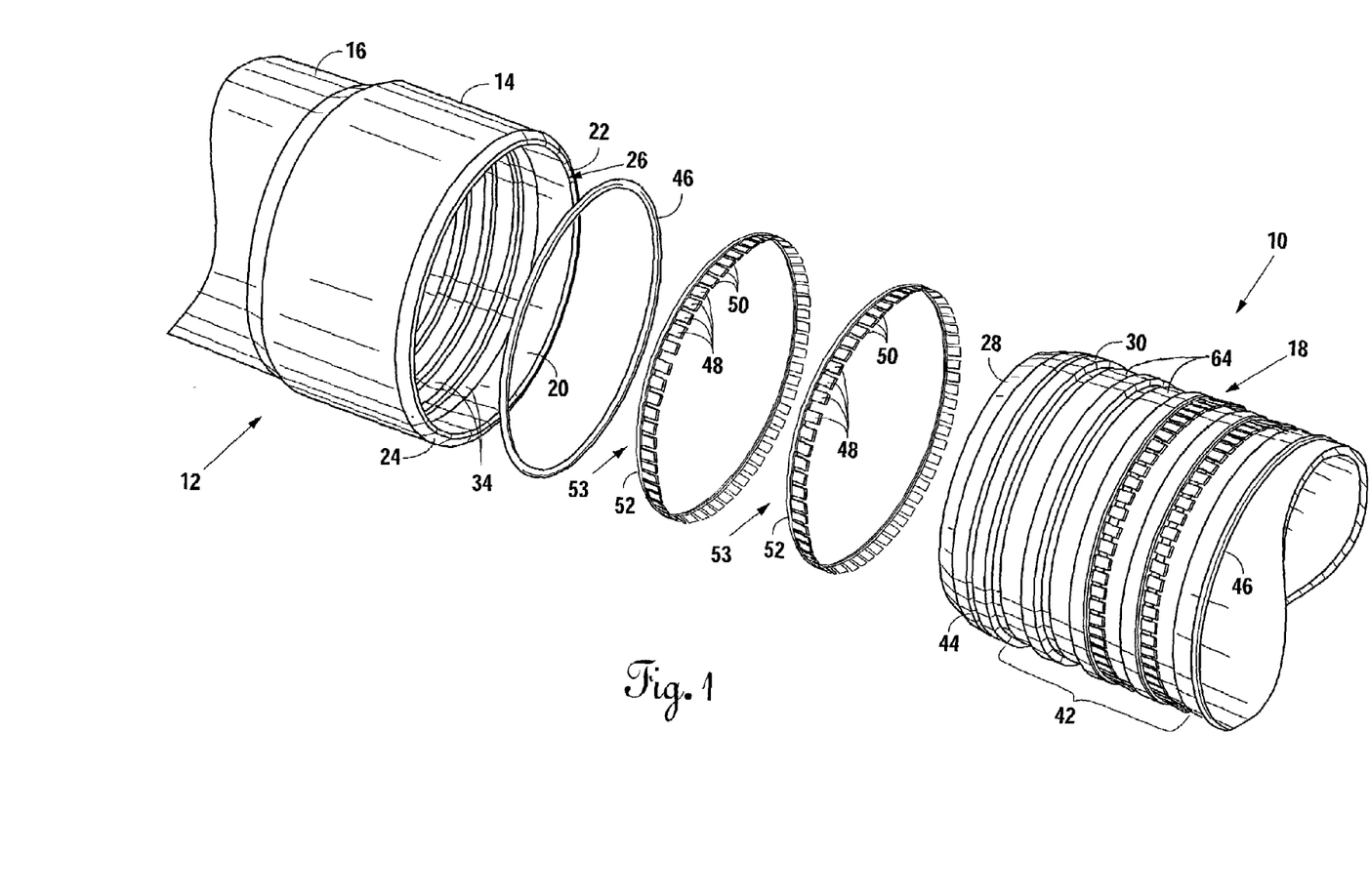
FIG. 1 is an exploded perspective view of the preferred embodiment of the present invention, as shown with the male end of the pipe and the female end of a similar adjacent pipe.
Figure 2:
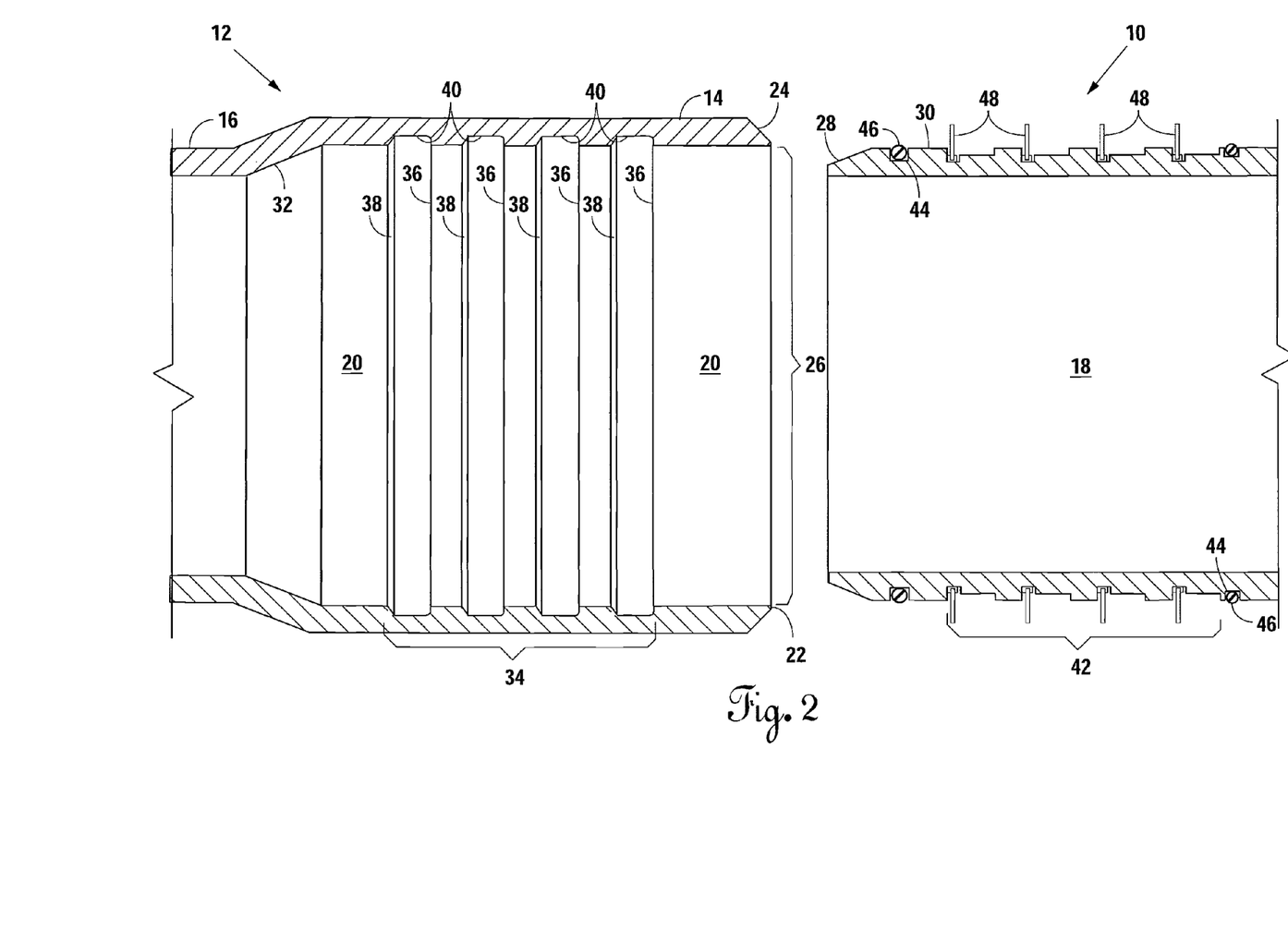
FIG. 2 is a cross sectional side view of the preferred embodiment for the present invention taken along the male end of the pipe and the female end of a similar adjacent pipe.

Pipe 10 has a female end 14, a male end 18, and an intermediate length 16 therebetween. Referring to FIGS. 1 and 2, the female end 14 has an interior surface 20 and a female leading edge 22 that terminates the female end 14. As shown in FIGS. 1-4, the female leading edge 22 has a bevel 24 at the outer diameter of the female end 14 in the preferred embodiment. Alternatively, the female leading edge 22 may have a bevel at the inner diameter of the female end 14 or may not be beveled at all. The interior surface 20 of the female end 14 defines a male end receiving chamber 26, which is essentially the interior space within the female end 14. The male end 18 of the pipe 10 has a male leading edge 28 and an exterior surface 30 with a circumference that is smaller in diameter than the diameter of the male end receiving chamber 26 on the female end 14.

Preferably, the male end receiving chamber 26 will ultimately receive the male end 18 of the similar adjacent pipe 12 with minimal clearance when the pipes are connected and may even create an interference fit; however, it is anticipated that certain applications may require a large clearance between connected pipes. In addition, the pipe 10 is sized according to the outer diameter of its intermediate length 16 and has a tensile yield strength that is largely dependent on the material from which pipe 10 is made.

A stop member 32 is disposed on the pipe 10 preferably at the interior end of the male end receiving chamber 26. In the preferred embodiment, as shown in FIGS. 1-4, the diameter of the male end receiving chamber 26 is larger than the interior diameter of the intermediate length 16. As such, the stop member 32 in the preferred embodiment is a circumferential shoulder formed by the reduction in diameter from the male end receiving chamber 26 to the interior diameter of the intermediate length 16. However, it is anticipated that stop member 32 could be other forms of circumferential shoulders, such as those present in "Flush Mount" connections or a shoulder on the exterior surface 30 of the male end 18. Further, stop member 32 could be other types of structure which limit the amount of insertion of the male end 18 into the female end 14 and which are well known in the art.

Figure 6:
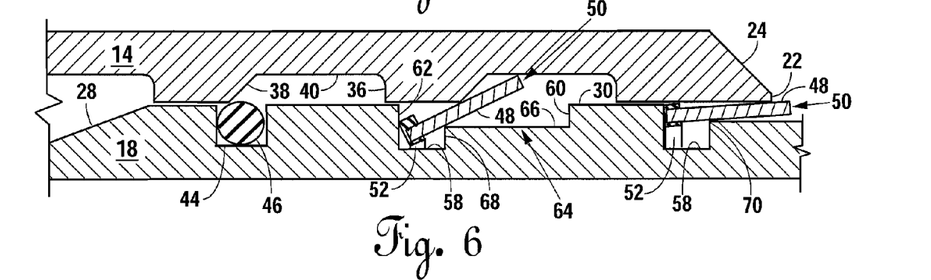
FIG. 6 is a cross sectional view showing a portion of the side profile of the preferred male end at another stage of insertion into the preferred female end of a similar adjacent pipe.
Figure 7:
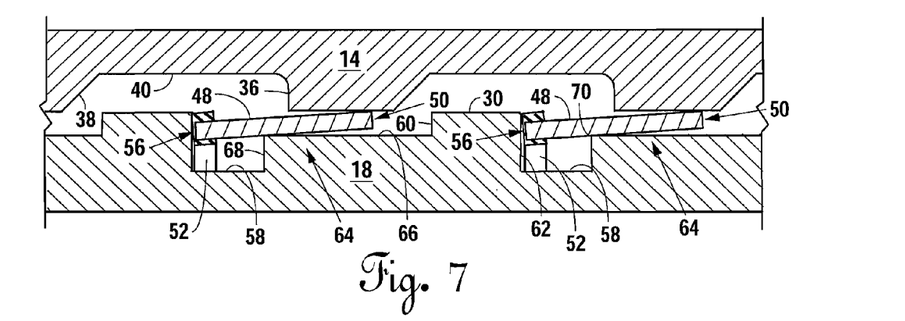
FIG. 7 is a cross sectional view showing a portion of the side profile of the preferred male end at another stage of insertion into the preferred female end of a similar adjacent pipe.
Figure 8:
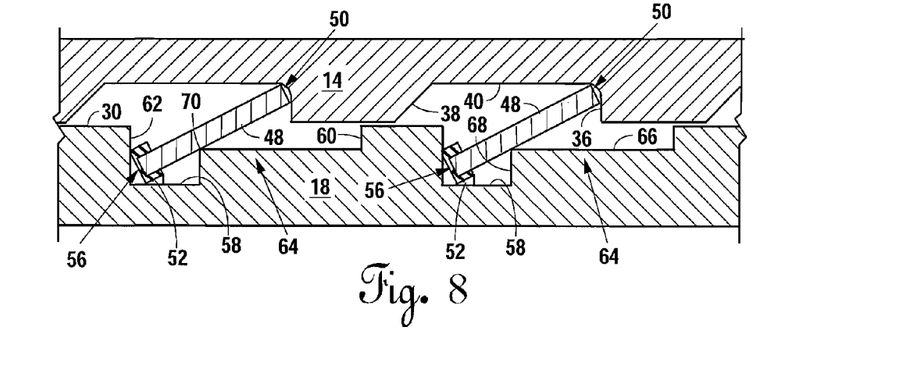
FIG. 8 is a cross sectional view showing a portion of the side profile of the preferred male end fully inserted into the preferred female end of a similar adjacent pipe, with the plurality of rigid fingers being positioned within their corresponding interior circumferential grooves of the female end.
Figure 9:
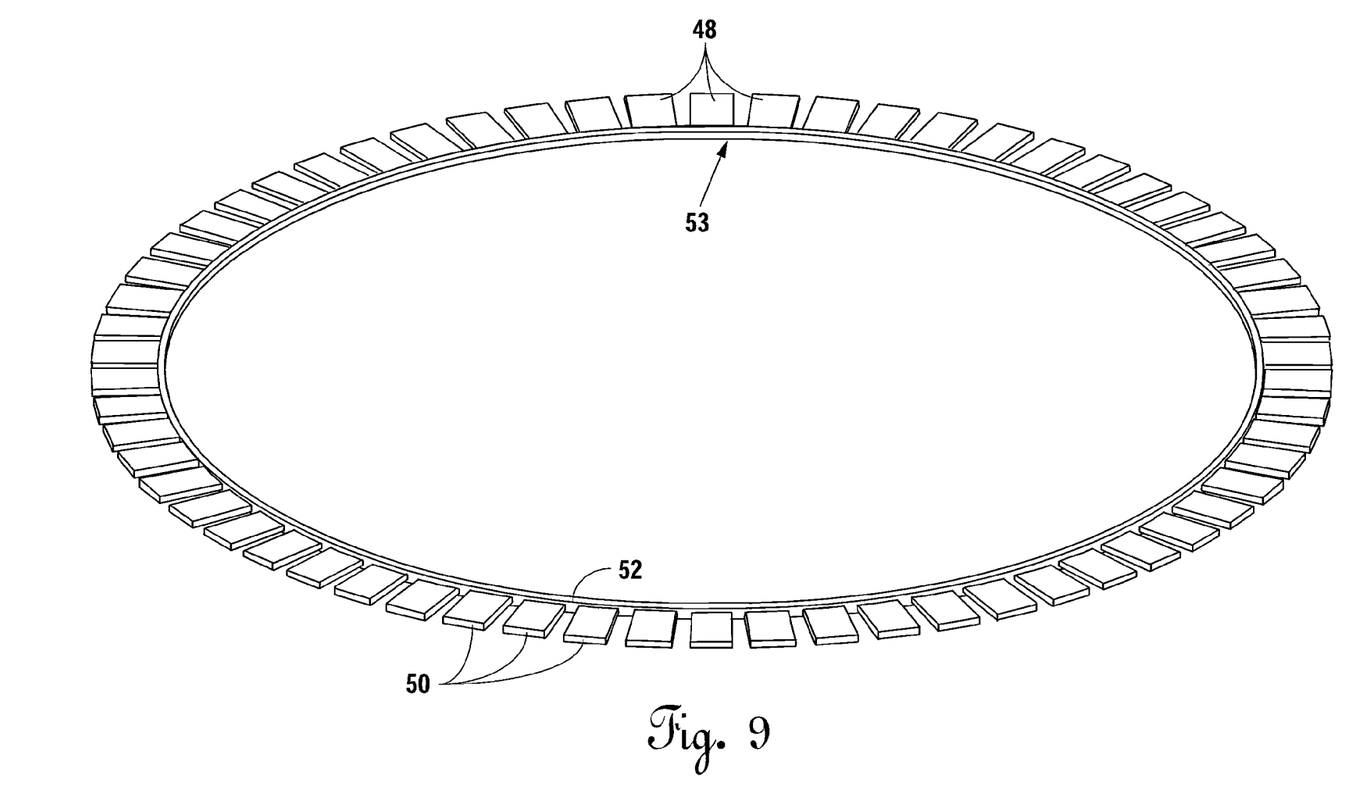
FIG. 9 is a perspective view of the preferred embodiment of the rigid fingers extending from a ring of elastomeric material.

The interior surface 20 of the female end 14 has a plurality of interior circumferential grooves 34 disposed on it. In the preferred embodiment, the number of interior circumferential grooves 34 is four. However, it is anticipated that this number could be more or less, and even as few as one, depending upon the application. As shown in FIGS. 6-8, each of the preferred interior circumferential grooves 34 preferably has a generally trapezoidal cross-section with a first sidewall 36, a second sidewall 38, and a bottom surface 40. Although preferably trapezoidal, it is anticipated that the interior circumferential grooves 34 could have a variety of cross-sections and may not even have the second sidewall 38, as long as the first sidewall 36 and the bottom surface 40 are present.

The first sidewall 36 in each of the interior circumferential grooves 34 is present on the side of the grooves nearest the female leading edge 22. The first sidewall 36 is critical for the present invention to achieve its objectives, as further discussed below. For the time being, it should be noted that in the preferred embodiment, the first sidewall 36 is straight and transverse to the interior surface 20 of the female end 14. Alternatively, the first sidewall 36 could extend from the interior surface 20 of the female end 14 at an angle toward the female leading edge 22. Further, the first sidewall 36 could also be curved in alternative embodiments.

The preferred interior circumferential grooves 34 also have the second sidewall 38 angled away from the female leading edge 22, thereby creating an obtuse angle between the bottom surface 40 and the second sidewall 38. As will be seen, angling the second sidewall 38 away from the female leading edge 22 decreases the amount of insertion force required to insert the male end 18 of the similar adjacent pipe 12 into the female end 14 of the pipe 10.

A plurality of exterior circumferential grooves 42 are disposed on the exterior surface 30 of the male end 18. Preferably, the number of exterior circumferential grooves 42 on the male end 18 will correspond with the number of interior circumferential grooves 34 on the interior surface 20 of the female end 14. Additionally, in the preferred embodiment, at least one circumferential sealing groove 44 with an O-ring 46 seated therein is also disposed on the exterior surface 30 of the male end 18. However, it is anticipated that in certain applications the circumferential sealing groove 44 and the O-ring 46 may be present on the interior surface 20 of the female end 14 or may not be present at all.

Figure 5:
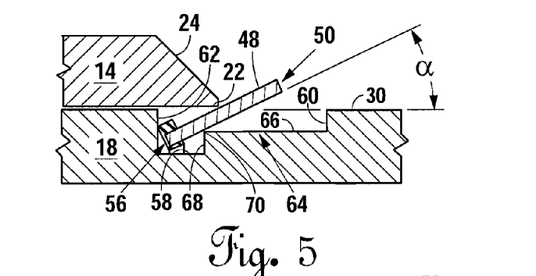
FIG. 5 is a cross sectional view showing the side profile of the preferred exterior circumferential groove on the male end and a finger from the plurality of rigid fingers extending from a ring seated within the groove, at one stage insertion into the preferred female end of a similar adjacent pipe.

A set of rigid fingers 48 extends out from within each of the exterior circumferential grooves 42 and each of the fingers 48 terminates at a distal end 50 (see FIG. 5) which is positioned out of the exterior circumferential grooves 42. Although rigid, each of the rigid fingers 48 is displaceable and the distal end 50 can be radially displaced in a direction toward and away from the exterior surface 30 of the male end 18. Preferably, the rigid fingers 48 are made of stainless steel but any number of substantially rigid materials could be used, depending on the application and the tensile forces involved The distal end 50 of each of the rigid fingers 48 is biased toward a non-displaced position (as shown in FIG. 5) out of the exterior circumferential grooves 42 unless acted upon by some force. However, each distal end 50 may partially enter into, and perhaps totally enter into, its respective exterior circumferential groove during insertion of the male end 18 of the pipe 10 into the female end 14 of the similar adjacent pipe 12, depending on the amount of clearance between the male end 18 and the female end 14.

In the preferred embodiment, each set of rigid fingers 48 extends from a band 53 that is formed from a continuous length of material and the band 53 has its ends joined so as to form a ring 52 that is seated within each of the exterior circumferential grooves 42 (see FIGS. 9-12). Preferably the ring 52 is elastic, is made from an elastomer, and has a rectangular cross-section profile, and each of the rigid fingers 48 has a proximal end 56 embedded within the ring 52 (see FIGS. 10-12). Being made from an elastomer, the preferred ring 52 can elastically deform and return to its original shape without affecting the integrity of the ring 52. The ring 52 extends circumferentially around the male end 18 of the pipe 10 and is preferably sized such that the ring 52 exerts a radially compressive force on a bottom surface 58 (see FIG. 5) of the exterior circumferential grooves 42. In other words, preferably the diameter of the ring 52 in its non-deformed state is smaller than the outer diameter of the male end 18 at the bottom surface 58 of the exterior circumferential grooves 42.

Figure 13:
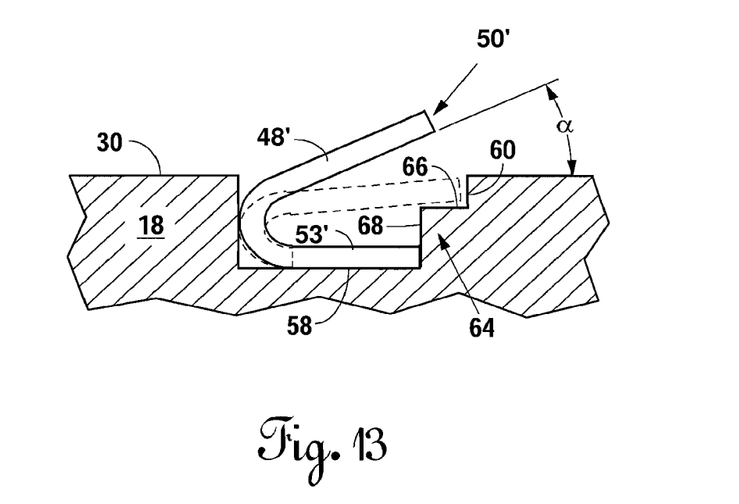
FIG. 13 is a cross sectional view showing the side profile of the preferred exterior circumferential groove on the male end and an alternative embodiment of the rigid fingers with the rigid fingers extending from a band seated within the groove.
Figure 14:
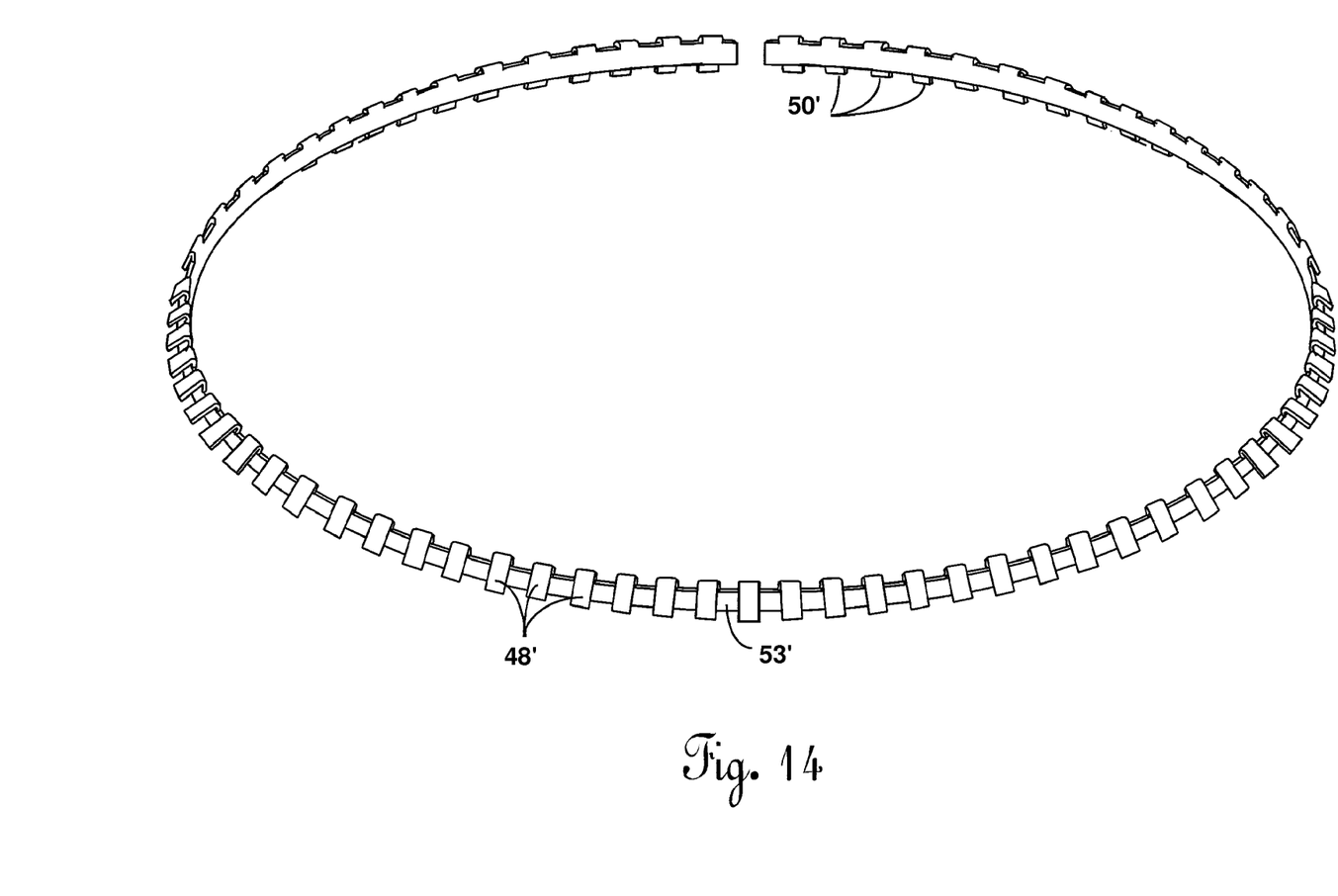
FIG. 14 is a perspective view showing the alternative embodiment of the rigid fingers with the fingers extending from a band.

It is anticipated, however, that the ring 52 may be formed from a material or materials that are not elastomers, or, the band 53 may not have its ends connected so as to form the ring 52. For example, a band 53' may be made from a material such as spring steel with a proximal end 56' (not shown) of rigid fingers 48' contiguous with or connected to the band 53'. The band 53' would be seated within each of the exterior circumferential grooves 42 such that the rigid fingers 48' would extend out of the exterior circumferential grooves 42, as shown in FIGS. 13 & 14. As shown in FIG. 14, the band 53' in this alternative embodiment would not extend circumferentially around the entire circumference of the male end 18 because the ends of the band 53' are not joined. As a further alternative embodiment, the rigid fingers may extend from a material that partially or completely fills the exterior circumferential grooves (not shown), such that the proximal end (not shown) of each of the rigid fingers is embedded within the material.

With the rigid fingers 48 extending out of the exterior circumferential grooves 42, an angle α is created between the exterior surface 30 of the male end 18 and each of the rigid fingers 48 (see FIG. 5), before insertion of the male end 18 into the female end 14 of a similar adjacent pipe 12. In the preferred embodiment, the angle α formed between the rigid fingers 48 and the exterior surface is 90°. However, the angle α may differ as between each set of rigid fingers 48 or even as between individual rigid fingers 48 within a single set, depending on the orientation of the elastic ring 52.

FIGS. 5-8 show the preferred embodiment the exterior circumferential grooves 42, which have a generally rectangular cross section profile with a first sidewall 60, a second sidewall 62, the bottom surface 58, and a shoulder 64 positioned in the groove adjacent the first sidewall 60. The shoulder 64 has a top surface 66, a side surface 68, and an edge 70 positioned at the junction between the top surface 66 and the side surface 68.

In the preferred embodiment, the ring 52 is seated between the second sidewall 62 and the side surface 68 of the shoulder 64 of the exterior circumferential grooves 42. When the male end 18 is inserted into the female end 14 and minimal clearance exists therebetween, the distal end 50 of each of the rigid fingers 48 is temporarily displaced in a direction toward the exterior surface 30 of the male end 18 and the length of the rigid fingers 48 are positioned at least partially, if not totally, in the exterior circumferential grooves 42. In this regard, the distal end 50 of each of the rigid fingers 48 (see FIG. 5) displaces into the space between the top surface 66 of the shoulder 64 and the top edge of the first sidewall 60 of the exterior circumferential grooves 42 (see FIGS. 6 & 7).

Figure 3:
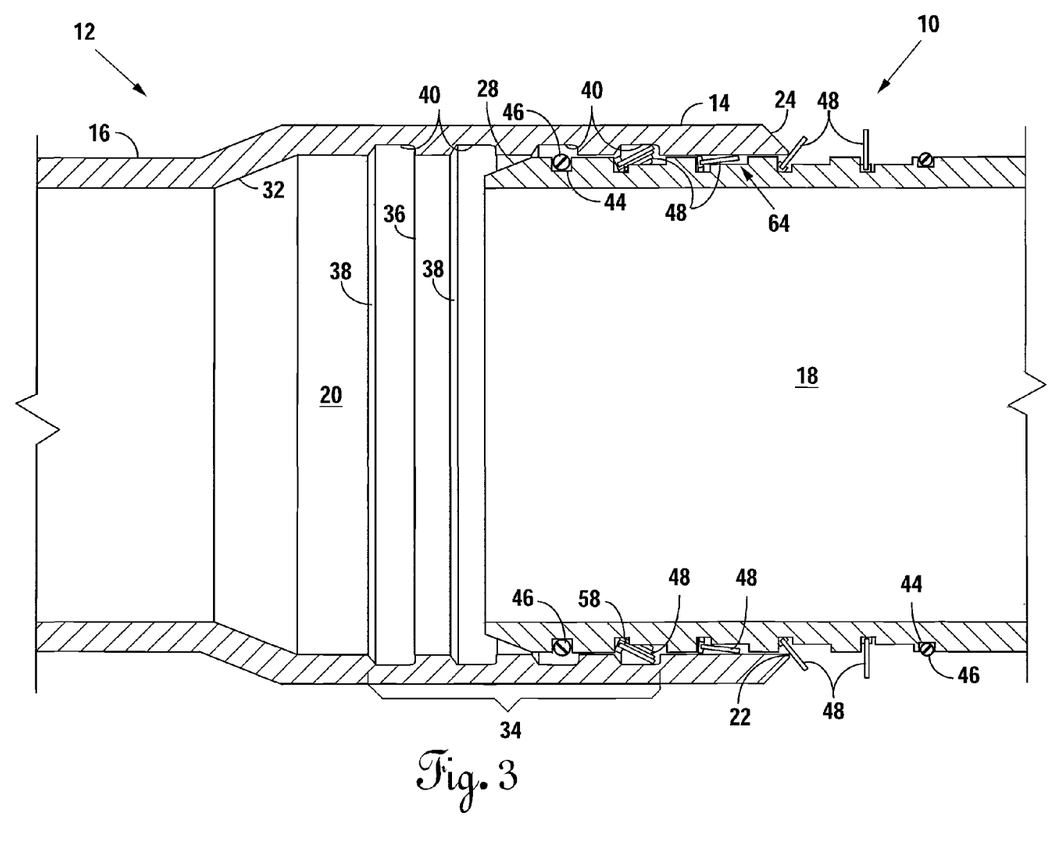
FIG. 3 is a cross sectional side view of the preferred embodiment for the present invention taken along the male end of the pipe and the female end of a similar adjacent pipe, with the male end being partially inserted within the female end.

FIG. 3 shows the male end 18 of the pipe 10 partially inserted into the male end receiving chamber 26 of the female end 14 of the similar adjacent pipe 12. As shown, the male leading edge 28 of the male end 18 is beveled in the preferred embodiment of the pipe 10, with the bevel being set at an approximately 20° radially inward angle with respect to the exterior surface 30 of the male end 18.

Figure 4:
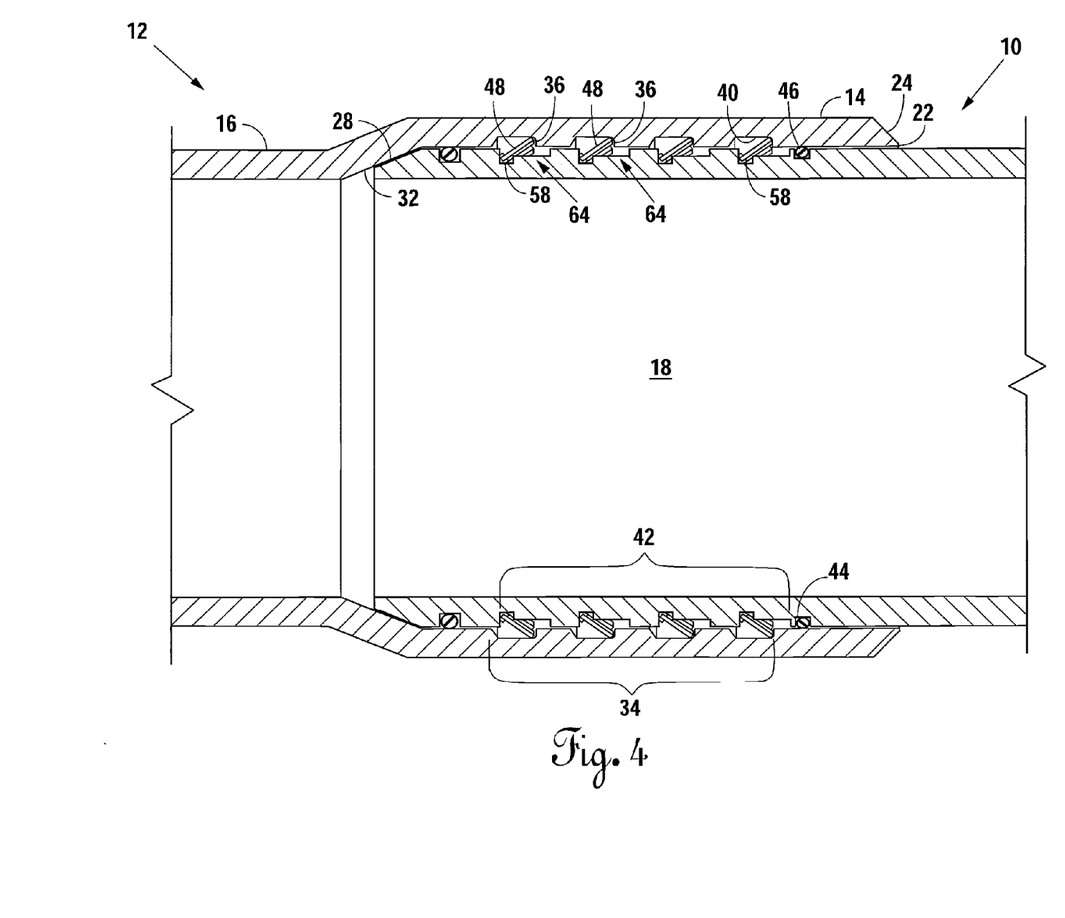
FIG. 4 is a cross sectional side view of the preferred embodiment for the present invention taken along the male end of the pipe and the female end of a similar adjacent pipe, with the male end being fully inserted within the male end receiving chamber and the plurality of rigid fingers being positioned within their corresponding interior circumferential grooves.

As discussed briefly above, the elastic ring 52 may be seated differently from one exterior circumferential groove to another because each ring 52 may have different orientation within each exterior circumferential groove. As a result, the angle α may be different for one set of rigid fingers 48 as compared to another set of rigid fingers 48 prior to insertion of the male end 18 into the female end 14. Further, the angle α may even differ among individual rigid fingers 48 in a single set prior to insertion because the elasticity of the preferred ring 52 of allows the ring 52 to partially rotate, or twist, within a single exterior circumferential groove. However, as the female leading edge 22 of the female end 14 of the similar adjacent pipe 12 contacts the rigid fingers 48 during insertion of the male end 18 of the pipe 10 each of the rigid fingers 48 is caused to rotate clockwise as shown in FIGS. 2-4. It can be appreciated that if the pipes shown were oriented in the opposite direction, the rotation of the rigid fingers 48 would be counterclockwise.

As noted, the female leading edge 22 of the female end 14 preferably has the bevel 24 cut into its outer diameter, which facilitates proper orientation of each of the rigid fingers 48 when the male end 18 of the pipe 10 is inserted into the female end 14 of the similar adjacent pipe 12. The bevel 24 allows the female leading edge 22 of the similar adjacent pipe 12 to slide under any of the rigid fingers 48 oriented such that their distal end 50 faces toward the male leading edge 28 of the pipe 10. With the bevel 24 under the rigid fingers 48, the female end 14 of the similar adjacent pipe 12 lifts the distal end 50 and rotates the rigid fingers 48 clockwise, displacing the distal end 50 of each of the rigid fingers 48 away from the male leading edge 28 of the pipe 10. Preferably, the bevel 24 is set at an approximately 45° radially inward angle with respect to the exterior surface of the female end 14.

As the male end 18 is inserted in to the male end receiving chamber 26, the interior surface 20 of the female end 14 contacts the sets of rigid fingers 48 and causes the distal end 50 of the rigid fingers 48 to be displaced toward the exterior surface 30 of the male end 18 (see FIGS. 6 & 7). In the preferred embodiment, the rigid fingers 48 contact the edge 70 of the shoulder 64 in the exterior circumferential grooves 42. Once the rigid fingers 48 contact the edge 70 of the shoulder 64, the edge 70 acts as a fulcrum causing further clockwise rotation of the rigid fingers 48 around the edge 70 and causing the distal end 50 of each of the rigid fingers 48 to displace toward the exterior surface 30 of the male end 18. Meanwhile, rotation of the rigid fingers 48 causes the proximal end 56 of each of the rigid fingers 48 to lift the elastic ring 52 from the bottom surface 58 of the exterior circumferential grooves 42 and displace it in a direction away from the bottom surface 58, and, thereby elastically deforming the elastic ring 52 (see FIG. 7).

The now elastically deformed ring 52, as shown in FIG. 7, will try to return to its original resting position prior to insertion of the male end 18 of the pipe into the female end 14 of the similar adjacent pipe 12, as shown in FIG. 2. Thus, the elastic ring 52 exerts a radially inward force on the proximal end 56 of each of the rigid fingers 48, effectively pulling or biasing each proximal end 56 of the rigid fingers 48 toward the bottom surface 58 of the exterior circumferential grooves 42.

FIG. 4 shows the male end 18 of the pipe 10 fully inserted into the male end receiving chamber 26 on the female end 14 of the similar adjacent pipe 12. When fully inserted, the male leading edge 28 of the male end 18 abuts the stop member 32 and male end 18 of the pipe 10 is prevented from further insertion into the similar adjacent pipe 12.

With the male end 18 fully inserted into the female end 14 the sets of rigid fingers 48 are positioned over their corresponding interior circumferential grooves 34 on the female end 14 of a similar adjacent pipe 12. The pulling or biasing force described above causes the rigid fingers 48 to rotate counterclockwise about the edge 70 of the shoulder 64, displacing the distal end 50 of each of the rigid fingers 48 toward the corresponding interior circumferential grooves 34. In this manner, the distal end 50 of each of the rigid fingers 48 is received within the corresponding interior circumferential grooves 34 on the interior surface 20 of the female end 14 (see FIG. 8). As noted, in the preferred embodiment the pulling or biasing force is caused by the preferred elastic ring 52 pulling the proximal end 56 of each of the rigid fingers 48 back toward the bottom surface 58 of the exterior circumferential grooves 42.

Preferably, a set of rigid fingers 48 becomes positioned within each interior circumferential groove such that the distal end 50 (see FIG. 5) of each of the rigid fingers 48 abuts the first sidewall 36 of the interior circumferential grooves 34; however, it is anticipated that abutment may not be achieved until tensile forces are applied to the connection between the pipe 10 and the similar adjacent pipe 12. The abutment of each distal end 50 of the rigid fingers 48 against the first sidewall 36 prevents withdrawal of the male end 18 of the pipe 10 out of the male end receiving chamber 26 of the female end 14 of the similar adjacent pipe 12, thereby locking the pipe 10 and the similar adjacent pipe 12 together.

Figure 10:
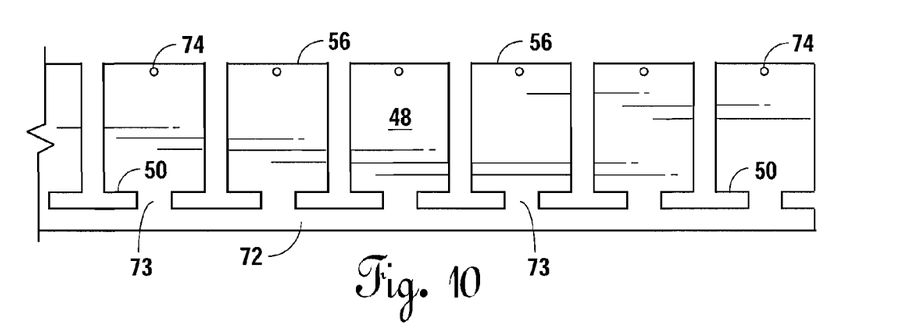
FIG. 10 is a side view of a portion of the preferred rigid fingers during a manufacturing stage that is prior to the strip of elastomeric material being deposited on the proximal end of the fingers, with a band extending between the distal ends of the rigid fingers.
Figure 11:
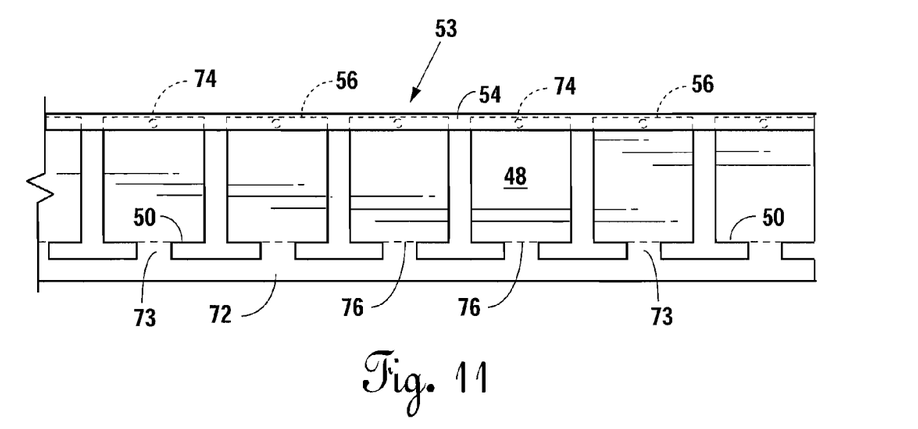
FIG. 11 is a side view of a portion of the preferred rigid fingers during a manufacturing stage after the strip of elastomeric material is deposited on the proximal end of the fingers.
Figure 12:
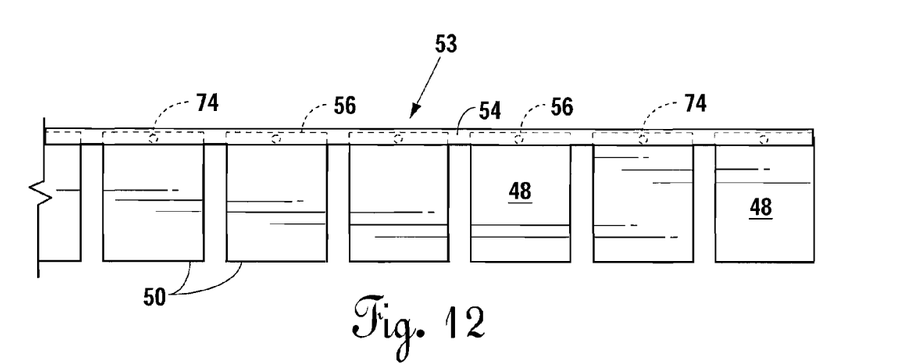
FIG. 12 is a side view of a portion of the preferred rigid fingers during the final manufacturing stage after the strip of elastomeric material is deposited on the proximal end of the fingers and the band extending between the rigid fingers has been removed.

FIGS. 10-12 show various manufacturing stages for the preferred embodiment of a portion of a set of rigid fingers 48 before the ends of the band 53 have been joined and the ring 52 is formed. FIG. 10 shows the rigid fingers 48 before the band 53 of an elastomeric material 54, which may be referred to as a strip of material 54, is molded around the proximal end 56 of each of the rigid fingers 48. As shown, a holding band 72 has tabs 73 which connect to each of the distal ends of the rigid fingers 48. The holding band 72, tabs 73, and the rigid fingers 48 are made from the same integral piece of rigid material, which has been stamped out, cut by a water jet, or otherwise formed from manufacturing processes that are well known in the art. Further, a hole 74 is stamped, cut, or otherwise formed in the proximal end 56 of each of the rigid fingers 48 from manufacturing processes that are well known in the art.

After the rigid fingers 48, the holding band 72, and the hole 74 are formed, the elastomeric material 54 is deposited to surround the proximal end 56 of the rigid fingers 48 (see FIG. 11). Preferably, the proximal end 56 of the rigid fingers 48 is inserted into a rectangular mold (not shown) and the elastomeric material 54 is injected into the mold. Preferably, the elastomeric material 54 flows around the proximal end 56 and through the hole 74 of each of the rigid fingers 48 during injection, thereby allowing a mechanical connection to be formed between the rigid fingers 48 and the elastomeric material 54. Alternatively, a chemical bond (not shown) could be formed between the elastomeric material 54 and the rigid fingers 48, which results from bonding processes well known in the art.

Once injected, the elastomeric material 54 is then allowed to cure and preferably undergoes vulcanization processes as part of the curing. Once fully cured, the rectangular mold is removed from around the now band 53 of elastomeric material 54. After the rectangular mold (not shown) is removed, the holding band 72 and the tabs 73 are removed, preferably by cutting along the dotted line 76 at the distal end 50 of each of the rigid fingers 48, as shown in FIG. 11. FIG. 12 shows the rigid fingers 48 after the holding band 72 has been removed. Once the holding band 72 is removed, the ends of the band 53 of elastomeric material 54 are joined, thereby creating the preferred elastic ring 52 of elastomeric material 54.

The number, shape, and size of rigid fingers 48 in each set of rigid fingers 48 is a design choice that depends on the application of the invention. With a 4" Nominal Pipe Size Schedule 40 PVC pipe, the preferred embodiment of the present invention has fifty-eight (58) stainless steel fingers in each set, with one set per exterior circumferential groove. Each of the rigid fingers 48 is 0.180 inches wide, 0.300 inches long, and 0.030 thick, prior to depositing the elastomeric material 54. Further, the sets of rigid fingers 48 have a 0.060 inch gap between each finger. As mentioned, the ring 52 preferably has a rectangular cross section, which is approximately, 0.040 inches high and 0.060 inches long prior to deformation. The pre-deformation circumference of the ring 52 varies, depending on the type of material from which it is made.

In the preferred embodiment, the amount of insertion force required to insert the male end 18 into the female end 14 can be varied by altering a number of factors. As noted, the ring 52 preferably is seated between the second sidewall 62 of the exterior circumferential grooves 42 and the side surface 68 of the shoulder 64. Altering the distance between the second sidewall 62 and the side surface 68 of the shoulder 64 will increase or decrease the amount of insertion force required. Other ways to alter the insertion force are to vary the length of the rigid fingers 48 or alter the length of the side surface 68 of the shoulder 68. In addition, the insertion force is reduced by the angled second sidewall 38 of the preferred interior circumferential grooves 34.

Another way to increase or decrease the amount of insertion force is by varying the hardness, or durometer, of the elastomeric material 54 of the ring 52. The softer the durometer of the material chosen for the ring 52, the easier it is for the ring 52 to elastically deform. Preferably, the elastomeric material 54 is a polymer such as Viton® or Buna-N (AKA Nitrile) having a "40 Shore A" durometer rating. Viton® and Buna-N (AKA Nitrile) are materials commonly used in O-rings for pipes and the materials are compatible in environments where the pipe 10 is continuously exposed to water. However, EPDM rubber or other types of material may be used, depending on the application and the environments encountered by the ring 52.

Although the present invention has been described with reference to specific embodiments, this description is not meant to be construed in a limiting sense. Various modifications of the disclosed embodiments, as well as alternative embodiments of the invention will become apparent to persons skilled in the art upon the reference to the above-description of the invention. It is, therefore, contemplated that the appended claims will cover such modifications that fall within the scope of the invention.

The invention claimed is:

1. A single piece of pipe connectable to an adjacent pipe, said single piece of pipe comprising:
a female end with an interior surface and a female leading edge terminating said female end, said interior surface of said female end defining a male end receiving chamber;
a male end with a male leading edge and an exterior surface, said exterior surface having a circumference smaller in diameter than the diameter of said male end receiving chamber of said female end;
an intermediate length between said female end and said male end;
at least one exterior circumferential groove on the exterior surface of said male end having a first exterior sidewall, a second exterior sidewall, a bottom exterior surface and a shoulder positioned within said at least one exterior circumferential groove;
at least one band seated within said at least one exterior circumferential groove on said male end, said at least one band having its ends joined to form a ring;
a first plurality of rigid fingers, each rigid finger having opposed distal and proximal ends, the proximal end of each of said first plurality of rigid fingers being embedded within said at least one band, and each of said first plurality of rigid finger extending from within and out of said exterior circumferential groove, said first plurality of rigid fingers being displaceable and being configured to rotate about (i) said shoulder of said at least one exterior circumferential groove when said first plurality of rigid fingers are in contact with said shoulder of said at least one exterior circumferential groove and (ii) their proximal ends when said first plurality of rigid fingers are not in contact with said shoulder of said at least one exterior circumferential groove, wherein the ring of said at least one band is configured to bias the first plurality of rigid fingers towards their non-displaced position when said first plurality of rigid fingers rotate about said shoulder of said at least one exterior circumferential groove; and
at least one interior circumferential groove on the interior surface of said female end, having a first interior sidewall, a second interior sidewall, and a bottom interior surface, said internal circumferential groove being sized and positioned to receive therein a second plurality of rigid fingers, wherein said second plurality of rigid fingers have opposed distal and proximal ends, the proximal end of each of said second plurality of rigid fingers being positioned proximal to a corresponding second exterior sidewall of at least one exterior circumferential groove on a male end of said adjacent pipe, and the distal end of each of said second plurality of rigid fingers being positioned proximal to the first interior sidewall of the at least one internal circumferential groove of said female end of said single piece of pipe.

2. The pipe as recited in claim 1 further comprising a stop member disposed on said pipe.

3. The pipe as recited in claim 2 wherein said stop member is a circumferential shoulder around the interior circumference of said female end positioned at the inner end of the male end receiving chamber, opposite the female leading edge.

4. The pipe as recited in claim 1, where said adjacent pipe includes an adjacent female end including at least one adjacent interior circumferential groove having an adjacent sidewall wherein the distal end of at least one finger of said first plurality of rigid fingers abuts the adjacent sidewall of the at least one adjacent interior circumferential groove of said adjacent pipe.

5. The pipe as recited in claim 1 wherein said at least one exterior circumferential groove has a substantially rectangular cross section.

6. The pipe as recited in claim 1 wherein said shoulder has a top surface and a side surface that meet to form an edge, and wherein said at least one band is positioned at least partially between said side surface of said shoulder and the second exterior sidewall of said at least one exterior circumferential groove.

7. The pipe as recited in claim 6 wherein at least one finger of said first plurality of rigid fingers contacts said edge formed by the top surface and side surface of the shoulder when the single piece of pipe is connected with the adjacent pipe.

8. The pipe as recited in claim 1 wherein said band is made from a continuous length of material.

9. The pipe as recited in claim 8 wherein said band is made from a material that is selected from the group consisting of metals, polymers, and fiberglass.

10. The pipe as recited in claim 9 wherein said band is elastic.

11. The pipe as recited in claim 1 wherein said band comprises a polymer.

12. The pipe as recited in claim 11 wherein said polymer is an elastomer.

13. The pipe as recited in claim 12 wherein said ring is sized to exert a radially compressive force on the bottom exterior surface of said at least one exterior circumferential groove when said first plurality of fingers is not displaced.

14. The pipe as recited in claim 1 wherein said at least one interior circumferential groove has a substantially trapezoidal cross section with said second interior sidewall and bottom interior surface forming an obtuse angle.

15. The pipe as recited in claim 1, further comprising at least one more interior circumferential groove on the interior surface of said female end and at least one more exterior circumferential groove on the exterior surface of said male end.

16. The pipe as recited in claim 1 wherein said diameter of said male end receiving chamber is larger than the interior diameter of said intermediate length.

17. The pipe as recited in claim 1 wherein said female leading edge of said female end is beveled.

18. The pipe as recited in claim 17 wherein said female edge is beveled at its outside diameter.

19. The pipe as recited in claim 1 wherein said male end further comprises at least one exterior circumferential sealing groove with an o-ring seated therein, said at least one exterior circumferential sealing groove being positioned on said exterior surface of said male end.

20. The pipe as recited in claim 1 wherein said male leading edge of said male end is beveled.

21. The pipe as recited in claim 1, wherein the rigid fingers are flat.

22. The pipe as recited in claim 1, wherein the rigid fingers are integral with the at least one band such that when the rigid fingers rotate, the at least one band also rotates.

23. The pipe as recited in claim 1, wherein the at least one band and the rigid fingers in profile substantially from a U shape or a V shape.

24. A single piece of pipe connectable to an adjacent pipe, said single piece of pipe comprising:
a female end with an inner surface and at least one interior circumferential groove disposed on said inner surface, said at least one receiving interior circumferential groove having a first interior sidewall, a second interior sidewall and a bottom interior surface positioned within said at least one interior circumferential groove;
a male end with an outer surface and at least one exterior circumferential groove disposed on said outer surface, said at least one exterior circumferential groove being alignable with a corresponding at least one receiving interior circumferential groove of a female end of said adjacent pipe when said single piece of pipe is connected to said adjacent pipe, said at least one exterior circumferential groove having a first exterior sidewall, a second exterior sidewall, a bottom exterior surface and a shoulder positioned within said at least one exterior circumferential groove;
an intermediate length between said female end and said male end; and,
at least one strip of material positioned entirely within said at least one exterior circumferential groove of said male end, wherein said at least one strip of material at least partially encircles said male end within said at least one exterior circumferential groove in which said strip of material is positioned; and
at least one set of rigid fingers, each set comprising one or more rigid fingers, each rigid finger having opposed distal and proximal ends, the proximal end of each of said set of rigid fingers being embedded within said at least one strip and each of the said set of rigid fingers extending from the at least one strip of material positioned proximal to the second exterior sidewall of said at least one exterior circumferential groove, said rigid fingers each being displaceable and receivable within and positionable proximal to a first interior sidewall of said at least one receiving interior circumferential groove of said female end of said adjacent pipe when said pipe and said adjacent pipe are connected; the at least one set of rigid fingers are further configured to rotate about (i) said shoulder of said at least one exterior circumferential groove when said first plurality of rigid fingers are in contact with said shoulder of said at least one exterior circumferential groove and (ii) their proximal ends when said first plurality of rigid fingers are not in contact with said shoulder of said at least one exterior circumferential groove, wherein the ring of said at least one band is configured to bias the first plurality of rigid fingers towards their non-displaced position when said first plurality of rigid fingers rotate about said shoulder of said at least one exterior circumferential groove.

25. The pipe as recited in claim 24, further comprising at least one more receiving interior circumferential groove disposed on said inner surface of said female end and at least one more exterior circumferential groove disposed on said outer surface of said male end.

26. The pipe as recited in claim 24 wherein said shoulder having a top surface and a side surface that meet to form an edge, and wherein said at least one strip of material is positioned at least partially between said side surface of said shoulder and the first or second exterior sidewall of said at least one exterior circumferential groove.

27. The pipe as recited in claim 26 wherein at least one finger of said first plurality of rigid fingers contacts said edge when the single piece of pipe is connected with the adjacent pipe.

* * * * *